Oct. 23, 1962   C. E. CLELAND ETAL   3,059,516
APPARATUS FOR MACHINING METAL SURFACES
Filed June 20, 1960   2 Sheets-Sheet 1
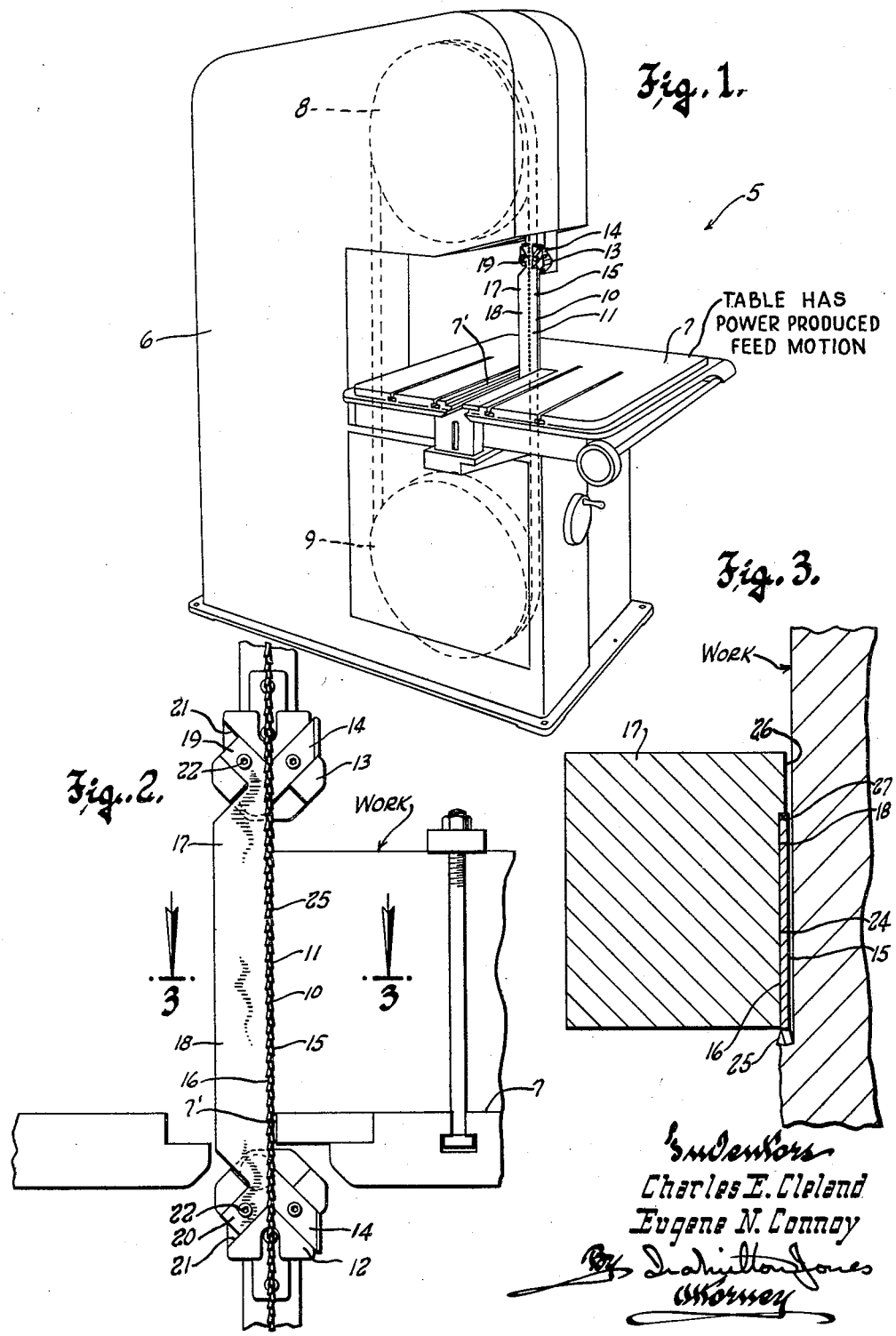

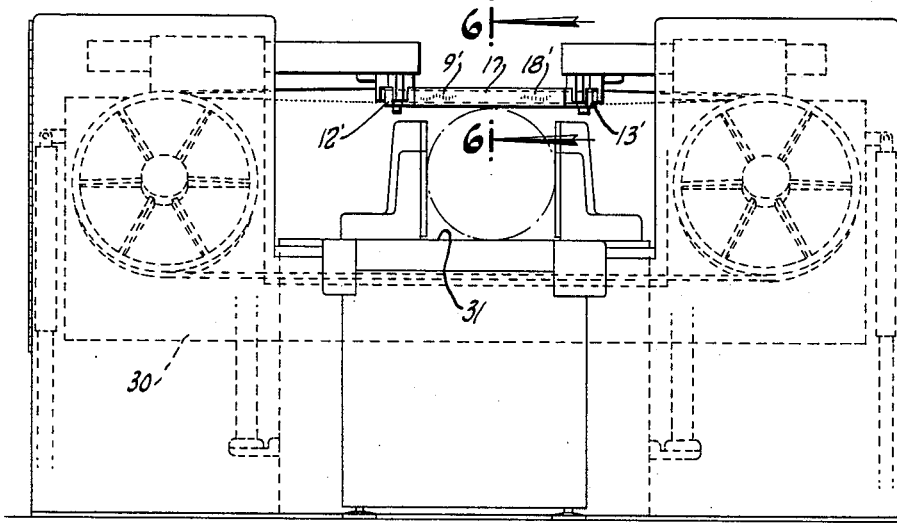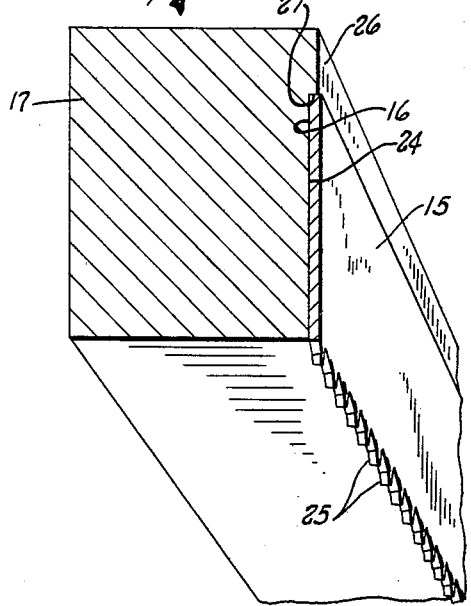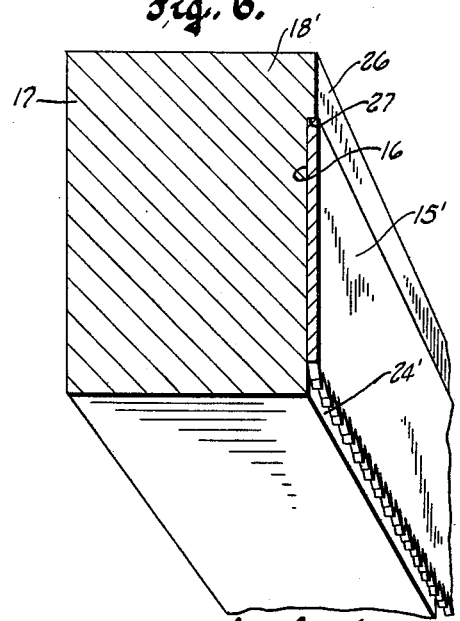

United States Patent Office 3,059,516
Patented Oct. 23, 1962

3,059,516
APPARATUS FOR MACHINING METAL SURFACES
Charles E. Cleland and Eugene N. Connoy, Minneapolis, Minn., assignors to Continental Machines, Inc., Savage, Minn., a corporation of Minnesota
Filed June 20, 1960, Ser. No. 37,290
5 Claims. (Cl. 83—201)

This invention relates generally to machine tools and has as its purpose to provide means whereby an ordinary metal cutting band saw can be used for machining the surface of a piece of work to accurate flatness, to thus enable the band saw to serve substantially the same purpose as a planer.

More specifically, it is an object of this invention to pro-provide a simple and inexpensive but very efficient adaptor or attachment for machine tools of the band saw type whereby the versatility of such a tool is increased by enabling it to be used for making an accurately flat finishing cut across the surface of a work piece.

Another object of this invention to provide an adaptor or attachment for the purpose described which can be quickly and easily installed on or removed from a band saw, so that, for example, where a piece of work has been cut from a block or bar of material by means of a band saw in the customary way, and as a result the just-cut surface of the workpiece lacks the desired flatness, the same machine, equipped and operated in accordance with this invention, can be used to take a finishing cut from said surface to make the same accurately flat.

In this connection, it is also an object of this invention to provide an adaptor or attachment for band sawing machines whereby the saw band of such a machine can be used for making a finishing cut across a surface of a work piece, and whereby such finishing cut can be made with substantially the usual and conventional band sawing technique employed during ordinary cutting operations by reason of the fact that the device of this invention solidly holds the saw band against flatwise flexure away from the work piece to thus afford assurance that the blade will at all times make a steady, straight cut during the finishing operation.

It will be apparent that a further object of this invention resides in the provision of an inexpensive and easily installed adaptor for band sawing machines which enables such a machine to be used for substantially the same purposes as a planer.

Another specific object of this invention resides in the provision of an attachment or adaptor of the character described which can be readily installed on and removed from a conventional band sawing machine and which can replace one of each of the pairs of saw guide inserts that normally steady and guide the band as it moves through the cutting zone of the machine.

With the above and other objects in view will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate two complete examples of the physical embodiments of the invention constructed according to the best modes so far devised for the practical application of the principles thereof, and in which:

FIGURE 1 is a front perspective view of a band sawing machine modified in accordance with this invention;

FIGURE 2 is a front elevational view on an enlarged scale of the cutting zone portion of the band sawing machine shown in FIGURE 1, and particularly showing the adaptor of this invention installed on the machine;

FIGURE 3 is a cross sectional view, taken on the plane of the line 3—3 in FIGURE 2;

FIGURE 4 is a cross sectional view, similar to FIGURE 3, but shown in perspective and with the workpiece removed;

FIGURE 5 is a front view of a band sawing machine of the cut-off type illustrated in Patent No. 2,898,669, and equipped with a modified form of the saw band and adaptor of this invention; and FIGURE 6 is a cross sectional view similar to FIGURE 4, through FIGURE 5 on the plane of the line 6—6.

Referring now more particularly to the accompanying drawings, the numeral 5 designates generally a band sawing machine which is conventional in that it has a C-shaped frame 6 with a work supporting table 7 mounted thereon for straight line power produced work feeding motion, and a pair of rotatable band wheels 8 and 9, one mounted above the table 7 and one below it. An endless saw band 10 is trained around the band wheels and has a straight vertical stretch 11 which travels down through the cutting zone above the work supporting table, and through the table, the table having a slot 7′ to accommodate the saw band in all positions of the table.

Fixed to the frame are a pair of saw guide supports 12 and 13, one directly below the table 7 and the other spaced above it, at the top of the cutting zone. These supports normally carry bar-like saw guide inserts that engage the opposite faces 15 and 16 of the band to steady and guide it as it moves through the cutting zone, and also support the band against edgewise flexure due to the thrust of the work thereon.

In this instance, however, only one saw guide insert 14 is mounted on each saw guide support, and both inserts are disposed on the same side of the band, in engagement with its face 15. The other guide inserts, which would normally engage the face 16 of the band, are replaced by the adaptor or attachment 17 of this invention, which comprises a rigidly stiff elongated rail 18 that engages the face 16 of the saw band all along the straight stretch 11 thereof that extends through the cutting zone. Although the adaptor 17 may be mounted in any suitable manner, it is preferably attached to the saw guide supports 12 and 13. For this purpose, bar-like mounting arms 19 and 20 project from the upper and lower ends of the rail 18 to seat in the same slots 21 in the saw guide supports that would otherwise hold guide inserts cooperating with the inserts 14. The same screws 22 that would normally detachably secure the guide inserts to the guide supports are used to hold the adaptor in place, the mounting arms 19 and 20 being provided with suitable holes to receive these screws.

As seen in FIGURE 3, the rail 18 of the adaptor has a flat side surface 24 upon which the face 16 of the band rides as it travels through the cutting zone. This surface 24 extends for the full height of the work zone and has a width to engage the saw band from the rear edge thereof to a line parallel to the edges of the band and spaced directly behind the gullets of its teeth 25.

Preferably, the rail 18 has an integral step or ledge 26 which rises from or projects beyond the side surface 24 along the rear edge thereof, a distance somewhat less than the thickness of the band, to provide a narrow forwardly facing shoulder 27 against which the rear edge of the band bears all along its cutting stretch. This shoulder solidly supports the band against edgewise flexure, and since no part of the rail projects beyond the face 15 of the saw band, this face of the band is exposed and unobstructed.

To machine a surface of a piece of work to flatness in accordance with this invention, the workpiece is secured to the table 7 with the surface to be finished parallel to the linear feed motion of the table and, hence, parallel to the surface 24 of the tool supporting rail 18. The workpiece must be so placed upon and secured to the table that only a portion thereof contiguous to the surface to be finished and not wider than the kerf which the saw band cuts is in line with or in front of the toothed edge of the saw band. FIGURE 3 illustrates this positional relationship. So placed, the workpiece does not project beyond the plane containing the points of the saw teeth which are set out from the face 16 of the saw band which rides upon the rail.

If the full width of the kerf is utilized in placing the workpiece, the material removed will have the maximum thickness permitted—which may be as much as one eighth of an inch—and ordinarily is more than needed to secure flatness in one pass. A thinner cut is, of course, permissible, but if possible the amount of material removed should be sufficient to assure removal of some material from even the lowest spots or areas on the surface to be finished. If this is not possible a second cut is required.

As the cutting action proceeds, all the material in front of the toothed edge of the saw band is, of course, removed, and since this is all of the material outwardly of the new work surface being formed, there is no kerf and hence no surface against which the blade may react to cause it to wander off course and into the workpiece. On the contrary, all forces imposed upon the saw band serve to hold it firmly against the flat supporting surface 24 of the rail. The finished surface of the workpiece, therefore, will have a flatness comparable to that attainable with a shaper or planer.

To illustrate how effective this invention is in achieving flatness, in one test that was made, and cutting at a rate eight times faster than that normally used in cutting through large cross sections of steel, as, for instance, 18" x 18", a flatness of .003 TIR was obtained. This compares with an out-of-flatness of one eighth of an inch (⅛") when the same band saw was used and operated to cut through the bar in the usual way.

FIGURES 5 and 6 illustrate the adaptation of the invention to a cut-off type band sawing machine wherein the relative work feeding motion between the saw band and the table is produced by having the entire saw carrying frame 30 move downwardly with a translatory motion to carry the cutting stretch 9' towards the work supporting table 31, as more fully disclosed in the aforesaid Patent No. 2,898,669. In this case, the band supporting rail 18', of course, extends horizontally between the saw guide supports 12' and 13', to which it is secured in the same way as previously described.

Since the saw band of this embodiment of the invention is of special design with all of the teeth that are set, set one way, namely, out from the work engaging face 15' of the saw band, the band-engaging surface 24' of the supporting rail 18' may and does supportingly engage the toothed edge of the saw band. This obviates the need for a separate adaptor for each width of saw band. Moreover, by supporting the band for its full width, better stability and accuracy are assured, an advantage which may outweigh the expense of providing a special saw band From the foregoing description taken together with the accompanying drawings, it will be apparent that this invention greatly increases the versatility of the conventional metal cutting band saw and band-type cut-off saw by enabling these machines to perform a surface finishing operation comparable to that attainable by a planer.

It will also be apparent that while this invention is particularly concerned with the attainment of accurately flat surfaces by means of a band saw, it may be advantageously used to improve the finish of contour-sawed surfaces, which though curved in the horizontal plane must be vertically straight. For this purpose it is, of course, necessary to continuously maintain the work accurately positioned with respect to the cutting edge of the saw band, but this can be done quite easily on the contour sawing machine of Patent No. 2,774,131, wherein the work is secured to a table capable of horizontal motion in any direction, and the operator has "finger-tip" control over the position of the work with respect to the saw band.

Where the invention is used to finish contour sawed curved surfaces, it is best to employ the special saw band and modified guide rail shown in FIGURE 6, since this affords increased stability for the cutting edge of the saw band.

What is claimed as our invention is:

1. In a machine tool of the character described: a work-supporting table; a band-like cutting tool having cutting teeth along one edge thereof, the other edge being smooth and substantially parallel to the general plane of the roots of the teeth, and the opposite faces of the cutting tool being parallel and smooth; means mounting the tool for lengthwise motion with a stretch thereof positioned to have cutting engagement with work on the table upon relative work-feeding motion between said stretch of the band-like cutting tool and the work; means supporting the cutting tool against edgewise flexure due to the thrust of the work thereon; a rigidly stiff tool supporting rail of a length at least as great as the length of said stretch of the band-like cutting tool engaged with the work during the machining thereof, said tool supporting rail having a flat smooth longitudinally extending supporting surface for its full length and a width at least as great as the width of the untoothed portion of the cutting tool; and means solidly mounting the tool supporting rail and holding it firmly in position with its said surface engaging one face of said stretch of the band-like cutting tool from the roots of its teeth to its opposite smooth edge and for the full length of that part of said stretch of the cutting tool which is engaged with the work during the machining thereof, and with no part of the tool supporting rail projecting beyond the opposite face of the band-like cutting tool which is thus exposed and unobstructed by the rail, so that as the tool rides upon said flat supporting surface of the rail, the latter holds the tool against being flexed laterally by pressure on its opposite exposed face, to enable the band-like cutting tool to produce an accurate cut across a surface of a work piece so placed on the table that the thickness of the material removed does not exceed the width of the cut that can be made by the tool.

2. In a machine tool, the structure of claim 1 wherein the machine is equipped with tool guide supports spaced apart along the length of said stretch of the band-like cutting tool, each of said guide supports having a pair of slots; wherein the means for mounting the tool supporting rail comprises an arm extending from each end of the rail, said arms being of a size and shape and so disposed with respect to one another and the rail that each arm is removably receivable in one of each pair of slots in the spaced apart guide supports; and means to removably secure the arms in said slots.

3. In a machine tool, the structure of claim 1, further characterized by: means on the tool-supporting rail forming a narrow longitudinally extending shoulder against which the smooth rear edge of the band-like cutting tool bears, so that the portion of the tool in cutting engagement with the work is directly supported against edgewise flexure due to load thereon during the machining operation, said shoulder projecting from the flat longitudinally extending surface of the rail a distance not in excess of the thickness of the band-like cutting tool.

4. In a machine tool, the structure of claim 1, wherein the work-supporting table is substantially horizontal, and said stretch of the band-like cutting tool travels in a path normal to the table; and wherein the tool-supporting rail is immediately above and projects up from the table.

5. In a machine tool, the structure of claim 4, wherein the machine is equipped with upper and lower tool guide supports respectively above and below the table, each of said tool-guide supports having a pair of slots; wherein the tool-supporting rail passes through the table and the means for mounting the tool-supporting rail comprises an arm extending from each end of the rail, said arms being of a size and shape and so disposed with respect to one another and the rail that each arm is removably receivable in one of each pair of slots in the upper and lower guide supports; and means to removably secure the arms in said slots.

References Cited in the file of this patent

UNITED STATES PATENTS

| | | |
|---|---|---|
| Re. 1,527 | Richards | Aug. 25, 1863 |
| 142,361 | Walker | Sept. 2, 1873 |

FOREIGN PATENTS

| | | |
|---|---|---|
| 499,836 | Belgium | Mar. 31, 1951 |